(12) United States Patent
Kawakami et al.

(10) Patent No.: US 6,182,088 B1
(45) Date of Patent: Jan. 30, 2001

(54) FILE SYSTEM AND FILE MANAGEMENT METHOD

(75) Inventors: Yasunori Kawakami, Hyogo-ken; Hiroshi Taniyama, Osaka-fu, both of (JP)

(73) Assignee: Matsushita Electric Industrial Co., Ltd., Osaka-Fu (JP)

( * ) Notice: Under 35 U.S.C. 154(b), the term of this patent shall be extended for 0 days.

(21) Appl. No.: 09/066,575

(22) Filed: Apr. 27, 1998

(30) Foreign Application Priority Data

Apr. 28, 1997 (JP) .................................................... 9-111069

(51) Int. Cl.$^7$ ...................................................... G06F 12/00
(52) U.S. Cl. .................................. 707/205; 707/6; 707/7; 707/101; 707/104; 707/200
(58) Field of Search .................................. 707/6, 7, 101, 707/102, 200, 205, 104; 711/4, 5, 103, 171

(56) References Cited

U.S. PATENT DOCUMENTS

| | | | | |
|---|---|---|---|---|
| 4,660,130 | * | 4/1987 | Bartley et al. ........................ | 707/101 |
| 5,305,295 | | 4/1994 | Chu ......................................... | 369/30 |
| 5,410,671 | * | 4/1995 | Elgamal et al. ....................... | 707/201 |
| 5,481,702 | | 1/1996 | Takahashi ............................. | 707/1 |
| 5,488,718 | * | 1/1996 | Tanaka et al. ......................... | 707/1 |
| 5,666,525 | * | 9/1997 | Ross ........................................ | 707/2 |
| 5,740,395 | * | 4/1998 | Well et al. ............................. | 711/103 |
| 6,000,006 | * | 12/1999 | Bruce et al. ........................... | 711/103 |

FOREIGN PATENT DOCUMENTS

| | | |
|---|---|---|
| 2-019938 | 1/1990 | (JP) . |
| 3-127137 | 5/1991 | (JP) . |
| 8-006825 | 1/1996 | (JP) . |
| 8-063377 | 3/1996 | (JP) . |

\* cited by examiner

*Primary Examiner*—Thomas G. Black
*Assistant Examiner*—Diane D. Mizrahi
(74) *Attorney, Agent, or Firm*—McDermott, Will & Emery

(57) ABSTRACT

The present invention relates to a file system using a disc memory storage and a method of managing the file system. Just like the ordinary server, a first block table Tb1 with the offset number of the file to be written in matched with the block number Dij of the data block is provided, and the data stored in the memory is read out on the basis of the contents of the first block table Tb1. On that file system, a second block registering means is provided which couples the block number allotted to the file to write and the offset number and, in case of consecutive block numbers, prepares a second block table Tb2 in which the first block number of the consecutive block numbers is paired with the offset number. A second take-out means is also provided. When consecutive data are to be read out, the second block take-out means arithmetically processes, on the basis of the contents of the second block table Tb2, the block numbers Dij to be read out and hands over the results to the data read-out means. That substantially reduces the access and processing time for read-out at the block table and makes the reading out of data highly efficient.

11 Claims, 6 Drawing Sheets

FIG. 2

Tb1 : 1st block table      Tb2 : 2nd block table (Data block number)

| | |
|---|---|
| O1 | DA1 |
| O2 | DA2 |
| | ⋮ |
| Om | DAm |
| O(m+1) | DB1 |
| O(m+2) | DB2 |
| | ⋮ |
| O(m+n) | DBn |

Offset number

| | |
|---|---|
| O1 | A1 |
| O(m+1) | B1 |

First offset number   First block number

FIG. 3

Tb1 : 1st block table

Tb2 : 2nd block table

| Offset | Tb1 |
|---|---|
| O1 | A1 |
| O2 | A2 |
| ⋮ | ⋮ |
| On | An |
| O(n+1) | B1 |
| O(n+2) | B2 |
| ⋮ | ⋮ |
| O(2n) | Bn |

Offset number

| Tb2 |
|---|
| A1 |
| B1 |

FILE SYSTEM AND FILE MANAGEMENT METHOD

FIELD OF THE INVENTION

The present invention relates to a file system using a disk memory storage and a method of managing the file system.

BACKGROUND OF THE INVENTION

The prior art file system is outlined in a block diagram in FIG. 5.

The prior art file system as illustrated in FIG. 5 is so configured that the memory area in the memory storage is divided into data blocks of a certain size, 8 kilobytes, for example, each data block is given a block number and its utilization status is controlled by a memory managing means (not shown in the figure) provided within the memory storage 90.

When a new file is to be formed, a file forming means 10 directs a data block allocation means 30 to allocate blocks for the new file. The file forming means 10 also obtains the numbers of the respective fragments of the data; these numbers, which correspond to the offset numbers of the file and shall be hereinafter called offset numbers, are given when the data to write is fragmented in the aforesaid data block size and are matched with the order of the fragmentation as, for example, F1, F2 . . . as shown in FIG. 5. The file forming means 10 then notifies a data writing means 40 of the data to write, that is the aforesaid fragmented data, and the offset numbers Ok in which k is a suffix, a positive integer, indicating the standing or order of the offset numbers.

Meanwhile, the memory managing means in the memory storage 90 supervises the unoccupation or occupation status of the respective data blocks, and the data block allocation means 30 searches that memory managing means for an unoccupied block in the memory storage 90 and notifies the data writing means 40 of the available block number Dij. By the way, the suffix ij indicates the position of a data block and all the block numbers should be one series of consecutive numbers on the memory storage 90, but for the sake of convenience, it is understood, i indicates a section made up of consecutive data blocks and is expressed in the capital letter of the alphabet (A, B . . . ) and j indicates the specific data block in the section i and is represented by a positive integer.

The data writing means 40 in turn notifies the block registering means 410 of the received block number Dij and the offset number Ok obtained from the file forming means 10. The block registering means 410 then registers with a block table Tb the received offset number Ok matched with the block number Dij and stores this block table Tb in the memory storage 90.

The data writing means 40 then writes the data in the space for the received block number Dij in the memory storage 90.

FIG. 6 is a conceptional diagram showing the makeup of a block table Tb in the prior art file system. With each block table Tb are registered the block numbers Dij representing the respective data blocks DA1, DA2 . . . DAm, DB1, . . . DBn in order of the corresponding offset numbers Ok. It is noted that the data blocks in the first series are physically consecutive from DA1, DA2, . . . DAm on the memory storage 90 and those in the other series run successively from DB1, DB2, . . . DBn, but no consecutiveness exists between the series with a suffix A and that with a suffix B.

When a specific file data stored in that state is to be read out on demand from outside, a file read-out means 20 notifies a block take-out means 420 of the offset number Ok for the file to be read out.

In practice, the aforesaid offset number Ok is inputted in the form of the time from the top and, in case of a file provided with a subheading, data to designate the subheading, and the file read-out means 20 gets an offset number on the basis of the inputted data.

In the next step, the block take-out means 420 reads out the aforesaid block table Tb stored in the memory storage 90, acquires the block number Dij from the block table Tb corresponding to the given offset number Ok and notifies the data read-out means 50 of that number. Receiving the block number Dij, the data read-out means 50 reads out the wanted data from the space on the memory storage indicated by the block number Dij and forwards the data to the file read-out means 20.

In the video server and the video-on-demand system, for example, it is necessary to read out image data and audio data from the memory storage 90 continuously and quickly. The cache technology, however, keeps the data read out from the memory storage 90 temporarily in a buffer, from which the needed data are picked out one by one. So in this operation, the time needed for the readout from the memory storage 90 to the buffer or the reading out from the buffer to outside differs with the processing size, block size, for example, and is so long that the data can not be processed very well on a continuous basis.

Suppose that a data compacted or reduced using an MPEG1 standard is to be written in and read out of 8-kilobyte-data blocks at the rate of 1.5 megabits/second or 192 kilobytes/second, for example. If the block table Tb is also 8 kilobytes in size and the block number is 4 bytes, then one block table Tb can manage data equivalent to only 85 seconds. In processing a long-hour image data, a large number of block tables Tb will have to be accessed, requiring a vast time.

To cope with that, it is proposed that when a specific length of file is allocated on the memory storage 90 in data writing, care is so taken that the physical area continuity or consecutiveness of consecutive data blocks is maintained on the memory storage 90 as far as possible.

At the start of reading out the data, furthermore, all the block numbers Dij for the data blocks allocated to the file are in advance read out on the block take-out means 420. This way, data can be read out at a high speed without reading out the contents of the block table Tb from the memory storage 90 while the data is read out.

In the above process the block table Tb which manages the block numbers Dij has to be read out, in a lump, from the memory storage 90 before the data starts to be read out. No more access to the table Tb is needed, though.

In that process, the consecutiveness of data blocks is recognizable on the basis of the consecutiveness of offset numbers. In the makeup of the block table Tb as above, however, the consecutiveness of data blocks can not be judged unless the block table Tb is read out from the memory storage 90 even if a plurality of data blocks in the same file are consecutive ones. In other words, all the contents in the block table Tb have to be read out at the start of reading out the data, and this method does not work very well when a speedier processing is required.

The present invention addresses that problem encountered with the prior art file system. And it is an object of the present invention to provide a file system and a method of managing the same, which reduces the amount of block tables to be read out before reading out data from the memory storage and permits a speedier processing of data.

SUMMARY OF THE INVENTION

To achieve the foregoing object, the present invention adopts the means described below. That is to say, the file system that forms the basis of the present invention is so configured that:

The memory area in the memory storage 90 is divided into data blocks of a specific size; the first block registering means 111 prepares a first block table Tb1 with the offset number of the file to bewritten matched with the block number Dij of the data block acquired by the data block allocation means 30, the block table is then stored in the memory storage 90, and the data writing means 40 then writes the data in the data block managed on the first block table Tb1; and the data read-out means 50 reads out the data on the basis of the contents of the first block table Tb1.

On that file system, the present invention is built. That is to say, a second block registering means 112 is provided which couples the block number allotted to the file to be written in and the offset number and, in case of consecutive block numbers, prepares a second block table Tb2 in which the first block number of the consecutive block numbers is paired with the offset number.

A second take-out means 122 is also provided. When consecutive data are to be read out, the second block take-out means 122 arithmetically processes, on the basis of the contents of the second block table Tb2, the block numbers Dij to be read out and hands over the results to the data read-out means 50.

That substantially reduces the access and processing time for read-out at the block table and makes the reading out of data highly efficient.

The data block allocation means 30 can be so formed that only when the block number Dij for the current offset number and that for the previous offset number are consecutive ones, the data blocks will be committed to writing by the data writing means 40. This way, datablocks among a group of unoccupied data blocks will be put to full and good use.

The data block allocation means 30 can also be so arranged as to pick out the consecutive unoccupied data blocks totaling a specific number of Z or more and to allot the offset numbers to the picked out data blocks. It is also possible to so operate that each time no unoccupied consecutive numbers totaling the specific number or more than that are found, the specific number of Z will be reduced by one, for example, to set a new specific number. This gradual lowering of the specific number (to Z-1, Z-2 . . . ) ensures effective writing of the data among a group of unoccupied data blocks.

With the specific number fixed, furthermore, it can be so arranged that the second block table Tb2 does not match the offset numbers, thus simplifying the second block table Tb2.

The specific number can be set by the data block allocation means 30 or can be made attribute of the file to be written in.

Also, it can be so arranged as to prepare a second block table Tb2 only when necessary. That is to say, file attribute information indicating the size and/or type of file is put on the file, and whether to prepare the second block table Tb2 is decided on according to the attribute.

BRIEF DESCRIPTION OF THE DRAWINGS

FIG. 2 is a conceptional diagram showing the makeup of the first and second block tables in the first embodiment according to the present invention.

FIG. 3 is a conceptional diagram showing the makeup of the first and second block tables in another embodiment according to the present invention.

EMBODIMENTS OF THE INVENTION

Embodiment 1

Figure 1:
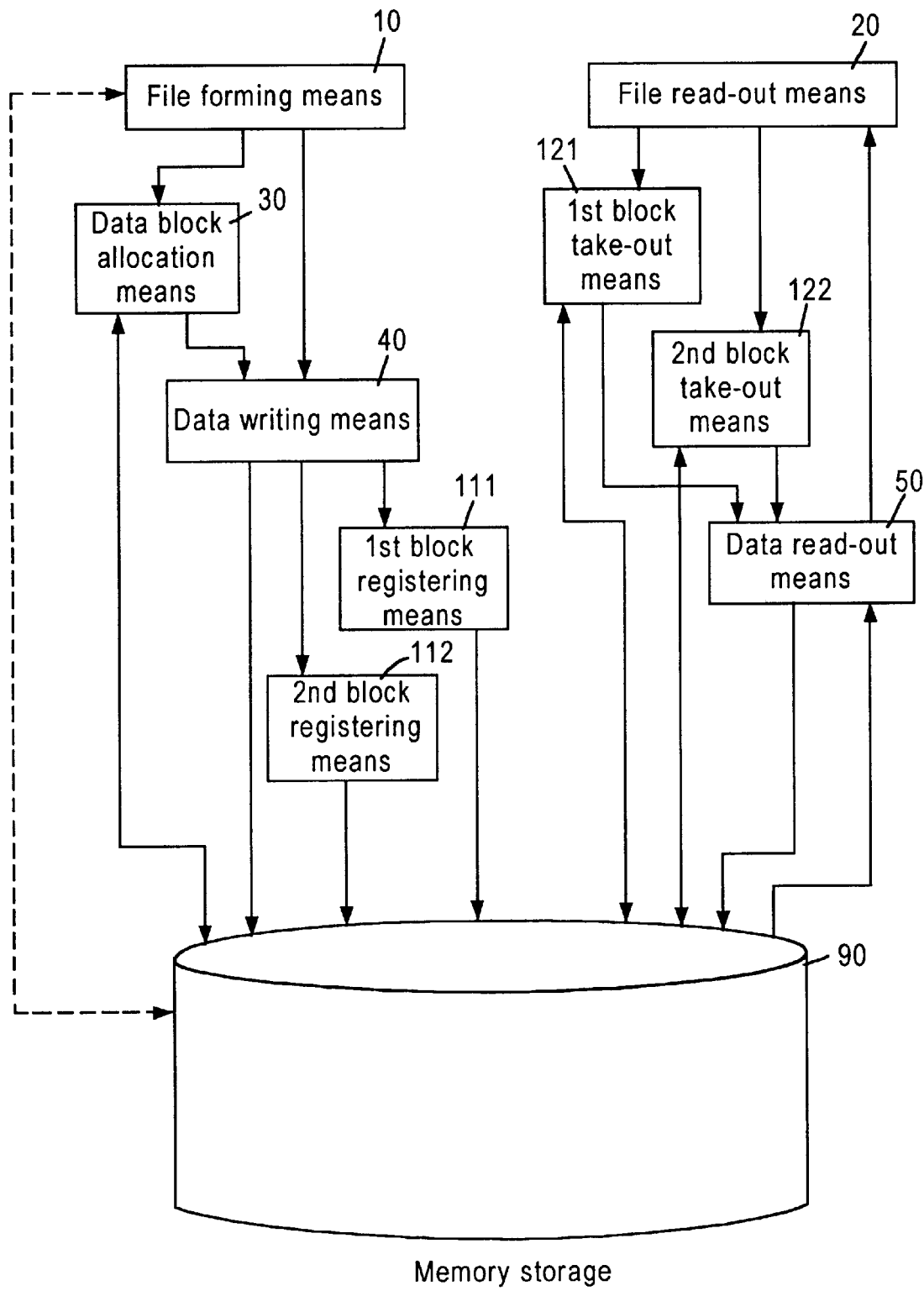
FIG. 1 is a block diagram showing the file system of the first embodiment according to the present invention.

The file system of the first embodiment according to the present invention is illustrated in FIG. 1. And the conceptional diagram in FIG. 2 shows examples of two block tables used in the first embodiment. The configuration as well as the operation of the present embodiment will now be described hereinafter.

On demand for writing from outside, a user terminal, for example, the file forming means 10 notifies the data writing means 40 of the data to write and the offset number thereof (given in order of fragmenting data in a specific size as described earlier) and at the same time commands the data block allocation means 30 to allot a data block on the memory storage 90 which is described below.

The memory storage 90 is divided into data blocks of a specific size, 8 kilobytes, for example, the respective data blocks managed by the memory managing means (not shown in the drawings) as by registering the utilization status on the table. Demanded for block allocation, the data block allocation means 30 searches the table to pick out an unoccupied data block on the memory storage 90 and notifies the data writing means 40 of the block number Dij.

The data writing means 40 in turn informs the first block registering means 111 and the second block registering means 112 of the received block number Dij and the corresponding offset number 0k.

Figure 6:
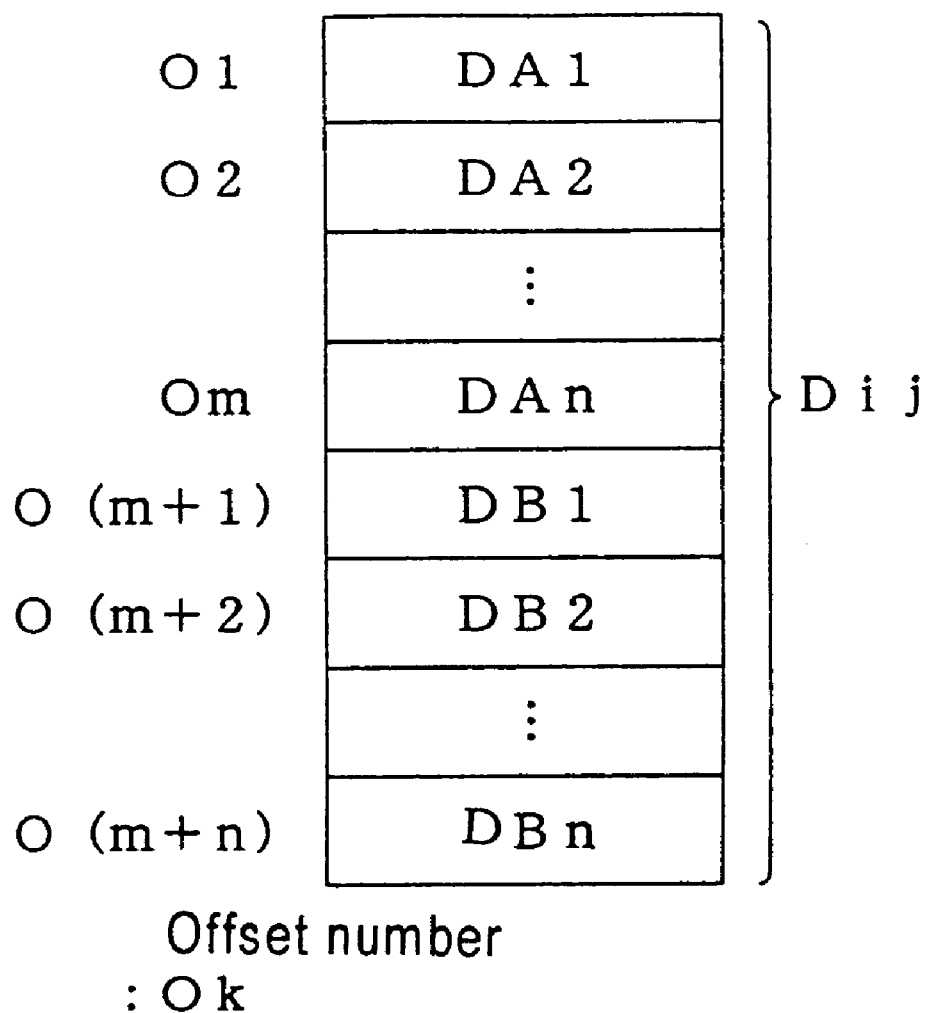
FIG. 6 is a diagram illustrating the file information data and block table of the prior art.

The first block registering means 111 then registers on the first block table Tb1 (identical with the prior art block table shown in FIG. 6) the received offset number 0k and the block number Dij of the data block corresponding to the offset number 0k as shown in FIG. 2(*a*), and stores this block table in the memory storage 90.

Meanwhile, the second block registering means 112 first checks whether the just received block number Dij and the block number allotted for the preceding offset number are consecutive. If the two numbers are consecutive ones, the second block registering means 112 finds out the block number of the top block in the group of consecutive data blocks including the allotted data block, registers on the second block table Tb2 the offset number 0k corresponding to the top block and the found out block number Dij of the top block as shown in FIG. 2(*b*) and stores the second block table Tb2 in the memory storage 90.

In case the found top block number is identical with the top block number last worked out, there will be no re-registering on the second block table Tb2.

Then, the data writing means 40 writes the file data in the space for the received block number in the memory storage 90.

FIG. 2 is a conceptional diagram showing the makeup of the first block table Tb1 and the second block table Tb2. With the first block table Tb1 are registered m pieces of consecutive block numbers Dij (=DA1, DA2, . . . DAm) of data blocks DA1, DA2, . . . DAm and n pieces of consecutive block numbers Dij (=DB1, DB2, . . . DBn) of data blocks DB1, DB2, . . . DBn in order of the corresponding offset numbers 0k. With the second block table Tb2 are registered the block number Dii (=DA1) of the top block DA1 in the group of m pieces of consecutive data blocks DA1, DA2, . . . DAm and the offset number 01 corresponding to the block number DA1 and the block number Dij (=DB1) of the top block DB1 in the group of n pieces of consecutive data blocks DB1, DB2, . . . DBn and the offset number 0(m+1) corresponding to the block number DB1. While an example of m or n pieces of consecutive numbers has been shown, it is not necessarily the requirement of the present embodiment that unoccupied data blocks are consecutive ones. That is, even a single unoccupied data block is committed to writing. In such a case, the same information is written in the first block table Tb1 and the second block table Tb2.

The arrangement on the writing side has just been described. Now, the makeup and operation on the read-out side will be explained. Whether the demand is, as will be explained below, for random read-out of data or for consecutive data is determined according to the type of the demanded data, the directory to which the data belong, the type of the terminal and other factors. But it is now a known technique and will not be described in detail here.

First, the random read-out of data will be illustrated.

The file read-out means 20 notifies the first block take-out means 121 of the offset number 0k of the data specified for read-out from outside, a user terminal, for example. The first block take-out means 121 then reads out the first block table Tb1 stored in the memory storage 90, acquires the block number Dij registered with the first block table Tb1 that matches the given offset number 0k, and informs the data read-out means 50 of the block number.

Receiving the block number Dij, the data read-out means 50 reads out from the memory storage 90 the data in the space on the memory storage 90 specified by that block number Dij and forwards the same to the file read-out means 20.

There will be now explained the process of reading out consecutive data.

The file read-out means 20 notifies the second block take-out means 122 of the offset number 0k of the data specified from outside for read-out. The second block take-out means 122 then reads out the second block table Tb2 stored in the memory storage 90, acquires the block number Dij of the top block in a group of consecutive blocks registered with the second block table Tb2 that corresponds to the given offset number 0k. Further, the second block take-out means 122 recognizes the number of the consecutive data blocks and the consecutive block numbers Dij from the contents of the second block table Tb2 thus obtained. That is to say, to be recognized is, as shown in FIG. 2, that data for offset numbers 01 to 0m are stored on consecutive data blocks A1 to Am on the memory storage 90 or data for offset numbers 0m+1 to 0m+n are housed on consecutive data blocks B1 to Bn on the memory storage 90.

The data storage information on a specific file on the memory storage 90 thus obtained is notified to the data read-out means 50. The data read-out means 50 in turn reads out the consecutive data from the memory storage 90 on the basis of that information and forwards the same to the file read-out means 20. The file read-out means 20 then forwards the data as obtained directly to outside or transmits consecutive data from a specified block downward.

As shown, all that has to do to read out consecutive data isto acquire the contents in the second block table Tb2, that is the top block number Dij of the consecutive data from the memory storage 90 in the present embodiment. Needless to say, in addition, the table size of the second block table Tb2 is far smaller than that of the first block table Tb1 as long as data blocks allotted are consecutive ones. Therefore, the second block table Tb2 can shorten the time required to read out data from a specific file in the memory storage 90 far more than the first block table Tb1.

Embodiment 2

Figure 4:
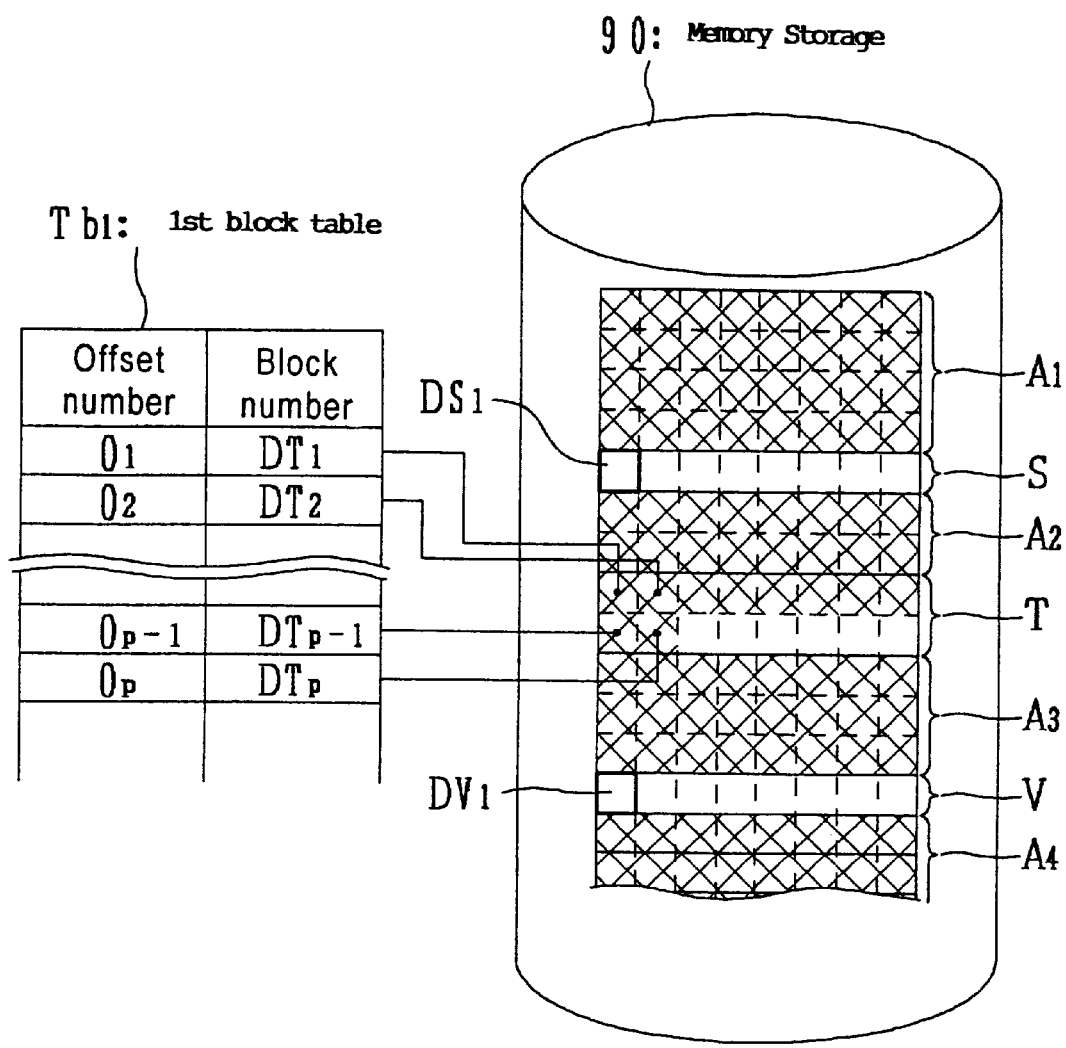
FIG. 4 is a conceptional diagram showing the writing area with some data blocks yet to be occupied in the memory storage according to the present invention.
Figure 5:
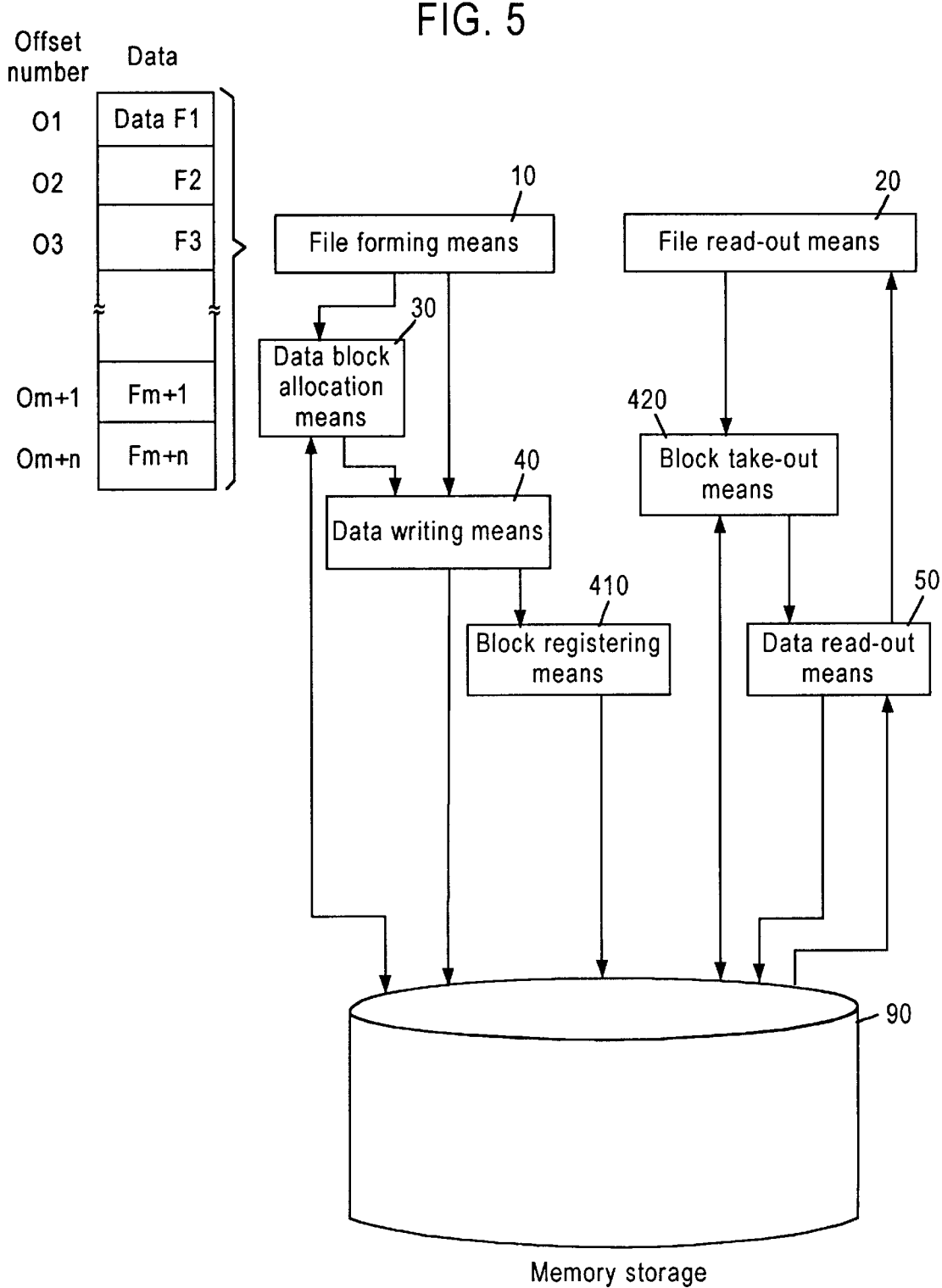
FIG. 5 is a block diagram showing the prior art file system.

The first embodiment can fail to make full use of the memory storage; when writing goes on in a certain group of consecutive data blocks with some data blocks still left unoccupied, another group with a larger number of unoccupied data blocks may be accessed, resulting in incomplete utilization of the memory storage 90. Let it be supposed that there are sections S, T and V with some unoccupied data blocks as shown in FIG. 4 and that data are being written in the unoccupied section T. When the remaining available capacity decreases below that of the partly unoccupied sections S and V as data writing in the section T proceeds, writing may shift to the section S or V with a larger number of unoccupied data blocks before the writing in the section T is completed. The time of shifting from one section to another is decided on mainly by the set operating conditions of the operating system(OS) and can not be changed in the arrangement of the first embodiment. In FIG. 4, it is noted, the sections A1 to A4 are already occupied.

In the way described below, it is possible to keep accessing from shifting to another group of unoccupied data blocks when writing still goes on as long as offset numbers are not allotted to all the data blocks in the group of unoccupied data blocks, that is, partially unoccupied section T.

The idea is this: before commanding the data block allocation means 30 to allocate blocks, the file forming means 10 gains access to the first block table in the memory storage 90 as shown in dotted line in FIG. 1, finds out the block number of the data block corresponding to the preceding offset number and notifies the data block allocation means 30 of that number as well as a command to allot a block. The data block allocation means 30 acquires the block number of an unoccupied data block from the memory storage 90 as in the first embodiment and judges whether the unoccupied data block number acquired and the aforementioned block number Dij obtained from the file forming means 10 are consecutive. Acquisition of a new block number is repeated until such a block number is found that is consecutively related to the preceding block number Dij acquired from the file forming means 10. When such a block number is obtained, the block number Dij is notified to the data writing means 40. In case no number fails to be obtained that satisfies that condition after all, the block number of any unoccupied data block will be given.

As shown, it will be ensured that the data block after the block number of the data block last allotted will be acquired as long as it is not occupied, thus excluding the possibility that when one data block group is worked on with some data blocks still left unoccupied, writing will shift to another data block group.

It is understood, however, that at the very beginning of the process, any number can be selected and that the data block corresponding to the first offset number, the data block DT1 corresponding to the offset number 01 in FIG. 4, for example, is the one freely selected. Also, when writing in a certain unoccupied section (section T in FIG. 4, for example) is completed, it can be freely decided to which section the writing is to be shifted, to section S or section V in FIG. 4, for example. In the present example, it is also noted, the data block allocation means 30 judges whether the block numbers of the previous and current data blocks are consecutive. Relaying this information on the judgement result to the second block registering means 112 enables the same to find the top data block of consecutive data blocks, the data block in any position selected in the aforesaid process, without checking the consecutiveness of the data blocks as in Embodiment 1.

Embodiment 3

In the present embodiment, consecutive data blocks not smaller than the specific number are found out, thus speeding up the processing.

To illustrate, the file forming means 10 commands the data block allocation means 30 to allocate data blocks. The data block allocation means 30 then acquires the block number of the first unoccupied data block and also acquires and retains all the block numbersin the group of the unoccupied data blocks that consecutively follow the first unoccupied data block and total a specific number or more than that. As in the preceding embodiments, the file forming means 10 notifies the data writing means 40 of the offset number 0k and the corresponding data. And the data block allocation means 30 informs the data writing means 40 of the block number Dij of the first data block of consecutive data blocks.

Under this setup, if the file forming means 10 issues a command to allocate a data block, the data block allocation means 30 notifies the data writing means 40 of the retained second block number Dij without searching the memory storage. This process is repeated until no retained block number Dij is left in the data block allocation means 30. After the last retained block number Dij is taken away, the block numbers of a new series of consecutive data blocks totaling not smaller than the specific number are newly acquired from the memory storage 90 in response to the next command issued by the file forming means 10.

In case no unoccupied consecutive data blocks numbering the specific number or more than that are found in a section because part of or all the unoccupied consecutive data blocks in a section are already allocated for other files, another section is searched for a series of unoccupied consecutive data blacks numbering the specific number or more than that, and if a series of such unoccupied consecutive data blocks is found, then the block number Dij of the first block is notified to the data writing means 40.

If no series of such unoccupied consecutive data blocks is found anywhere, then the data block allocation means 30 reduces the specific number Z by one and restarts the search. In other words, if no unoccupied consecutive data blocks numbering the specific number Z or more than that are available anywhere, then unoccupied consecutive data blocks numbering Z-1 is looked for. If no such data blocks totaling Z-1 pieces are found again, the specific number is further reduced to Z-2 and the research is continued.

Thus, the repetition of that process ensures that a series of unoccupied consecutive data blocks will be eventually spotted among the groups of unoccupied consecutive data blocks managed by the data block allocation means 30.

Embodiment 4

It is also all right if the specific number is given to the data block allocation means 30 from the file side. The idea is this: information on the predetermined number of consecutive data blocks is beforehand inputted in every file to be formed. In making a search for a series of unoccupied consecutive data blocks, the data block allocation means 30 acquires from the file forming means 10 the information on the number of consecutive data blocks inputted in the file and then looks for a series of unoccupied consecutive data blocks numbering that or more than that.

That permits controlling the number of consecutive data blocks file by file. In a file storing image and audio data, for example, the size of the second block table Tb2 can be minimized by maximizing the number of consecutive data blocks.

Embodiment 5

In the foregoing embodiments, the unoccupied consecutive data blocks to be looked for should number a specific number or more than that. The number can be fixed at the specific number in the present embodiment. The principle is this: the data block allocation means 30 is so designed to search for unoccupied consecutive data blocks totaling exactly the predetermined number, so that data blocks will be allocated to the file always by the group of a specific number of consecutive data blocks. And it is so arranged that only the block number of the top block in the series of data blocks is stored in the second block table Tb2 instead of the offset number 0k corresponding to the top block of the series of consecutive blocks as shown in FIG. 3(b). In addition, of course, the second block take-out means 122 is made to recognizes that specific number. In reading out a series of consecutive data, the second block take-out means 122 reads only the block number of the top block. And the following consecutive data blocks can be read out without using the offset number 0k, whereby the size of the second block table Tb2 can be reduced.

Embodiment 6

In all the foregoing embodiments, a second block table is created. But some files can do without a second block table in this arrangement: The file attribute information indicating the size and/or type of file is beforehand added to the file. In registering the block number Dij of the top block of a series of consecutive data blocks with the second block table Tb2, the second block table registering means judges whether to start registration on the basis of the file attribute information in the file.

If the file size is smaller than the number of the consecutive data blocks, for example, it can be decided that registration with the second block table should not be started, thus eliminating the need to have a second block table Tb2 which is not small in table size.

If the data block allotted for the file is in a group of consecutive data blocks, only the block number of the top data block of the series of the data blocks will be registered with the second block tables according to the present invention. Therefore, the table size of the second block table will be smaller than that of the first block table with which the block numbers of all the allocated data blocks are registered. Thus, this arrangement can save time in reading out the whole series of block numbers from the memory storage to acquire the block numbers of all the data blocks allocated to the file.

What is claimed is:

1. A file system managing method, comprising:

dividing the memory space in the memory storage into data blocks in a specific unit size, managing the block numbers of data blocks allocated to a file to be written in by matching said block numbers and the offset numbers of said file in a first block table, reading out data corresponding to said file by referring to the contents of said first block table, preparing a second block table by associating the offset numbers of the file with the block numbers of the data blocks allocated to the file to write and, in case of consecutive block numbers of consecutive data blocks allocated to the file, by associating the top block number of said consecutive data block numbers with a corresponding offset number, and reading out the consecutive data blocks allocated to the file on the basis of the contents of the second block.

2. A file system, comprising;

dividing the memory space in the memory storage into data blocks in a specific unit size;

preparing a first block table associating, by the first block registering means, the block numbers of data blocks acquired from a data block allocation means with the offset numbers of the file to be written in and storing said first block table in a memory managing means;

writing, by a data writing means, data in the data blocks managed in said first block table and reading out data on the basis of the contents in said first block table;

using a second block registering means to prepare a second block table by associating the offset numbers of the file the block numbers of the data blocks allocated to said file to be written in and, in case of consecutive block numbers of consecutive data blocks allocated to the file, by associating the top block number of said consecutive data blocks with a corresponding offset number and storing said second block table in said memory managing means; and using a second block take-out means to arithmetically process the block numbers to read out according to the contents of said second block table and outputting the numbers to said data read-out means when consecutive data are to be read out.

3. The file system as defined in claim 2, wherein said data block allocation means commits data blocks to writing by the data writing means only when the block number corresponding to the current offset number and the block number corresponding to the preceding offset number are consecutive.

4. The file system as defined in claim 2, wherein said data block allocation means picks out unoccupied consecutive data blocks totaling a specific number or more than that and allots to said picked out data blocks the offset numbers of the file to be written in.

5. The file system as defined in claim 4, wherein said specific number is reduced by one to produce a new specific number each time the number of unoccupied consecutive data blocks is less than said specific number.

6. The file system as defined in claim 4, wherein said specific number is a fixed value and a second block table is prepared with only the block number of the top data block of a certain number of consecutive data blocks written therein.

7. The file system as defined in claim 4, wherein said specific number is written as attribute to a file to be written in.

8. The file system as defined in claim 2, wherein with the size and/or type of a file inputted in said file as file attribute information, said second block registering means judges whether to start registration according to said file attribute information before registering with said second block table said block number of the top data block of said series of consecutive data blocks, and wherein in continuously reading out file data, said block take-out means acquires a block number by using said first block take-out means if no bock number is registered with said second block table and gets the number from said second block table if the number is registered therein.

9. The file system as defined in claim 2, wherein file data are read out according to the contents of said first block table in case said data are to be read out at random.

10. A file system managing method, comprising:

(a) dividing the memory space in the memory storage into data blocks in a specific unit size;

(b) preparing a first block table associating block numbers of data blocks allocated to a file to be written and the offset numbers of said file;

(c) determining, if consecutive block numbers of consecutive data blocks are allocated to the file, a top block number of the consecutive data block numbers with a corresponding offset number;

(d) preparing a second block table associating the top block number of the consecutive data block numbers and the corresponding offset number determined in step (c); and (d) reading out data corresponding to the file by referring to the contents of the first block table and, in case of consecutive block numbers of consecutive data blocks allocated to the file, the second block table.

11. A file management system, comprising:

(a) dividing a memory space in a memory storage into data blocks of a predetermined unit size;

(b) allocating a predetermined number of consecutive data blocks to a file;

(c) preparing a first block table associating, by a first block registering means, block numbers of data blocks allocated to the file and the offset numbers of the file;

(d) storing the first block table in a memory managing means;

(e) preparing a second block table using a second block table registering means, the second block table including a top block number of the predetermined number of consecutive data block numbers allocated to the file;

(f) storing the second block table in the memory managing means; and (g) reading the second block table, using a second block take-out means adapted programmed to correlate the top block number of the second block table with the predetermined number of consecutive data blocks allocated to the file, and accessing the consecutive data blocks allocated to the file without using the offset numbers.

* * * * *